Patented July 31, 1928.

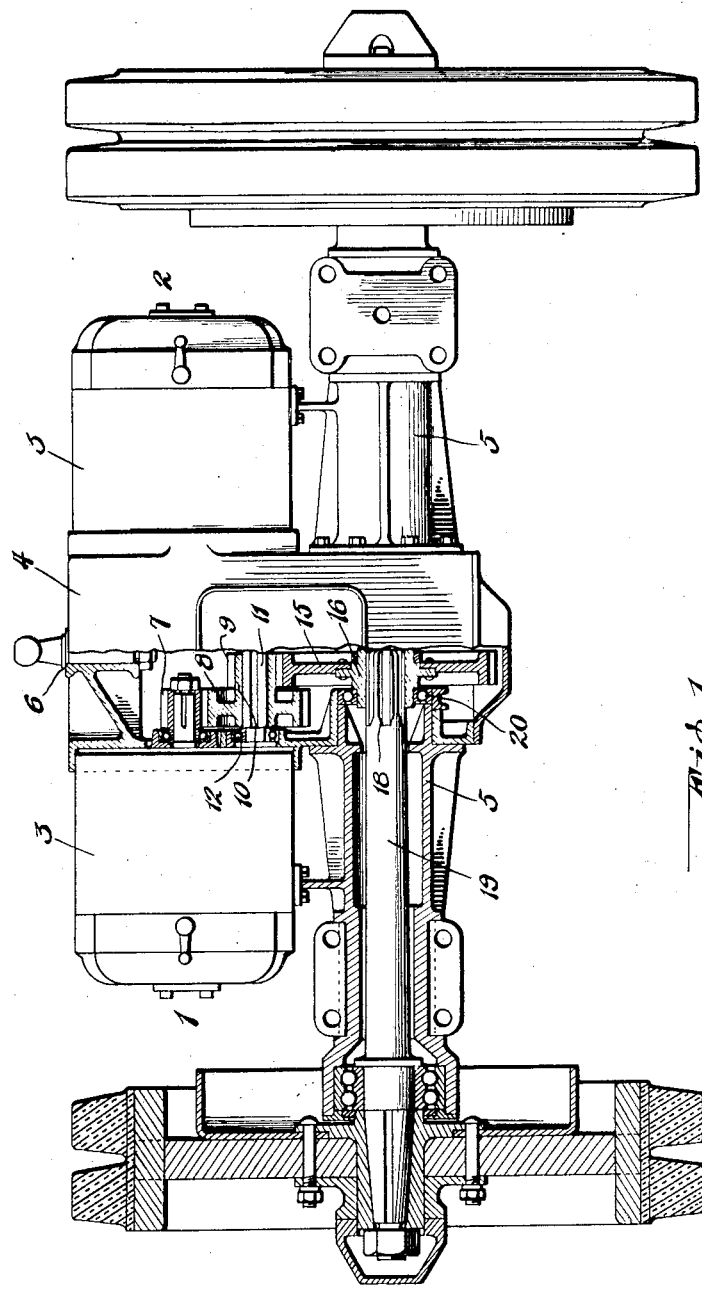

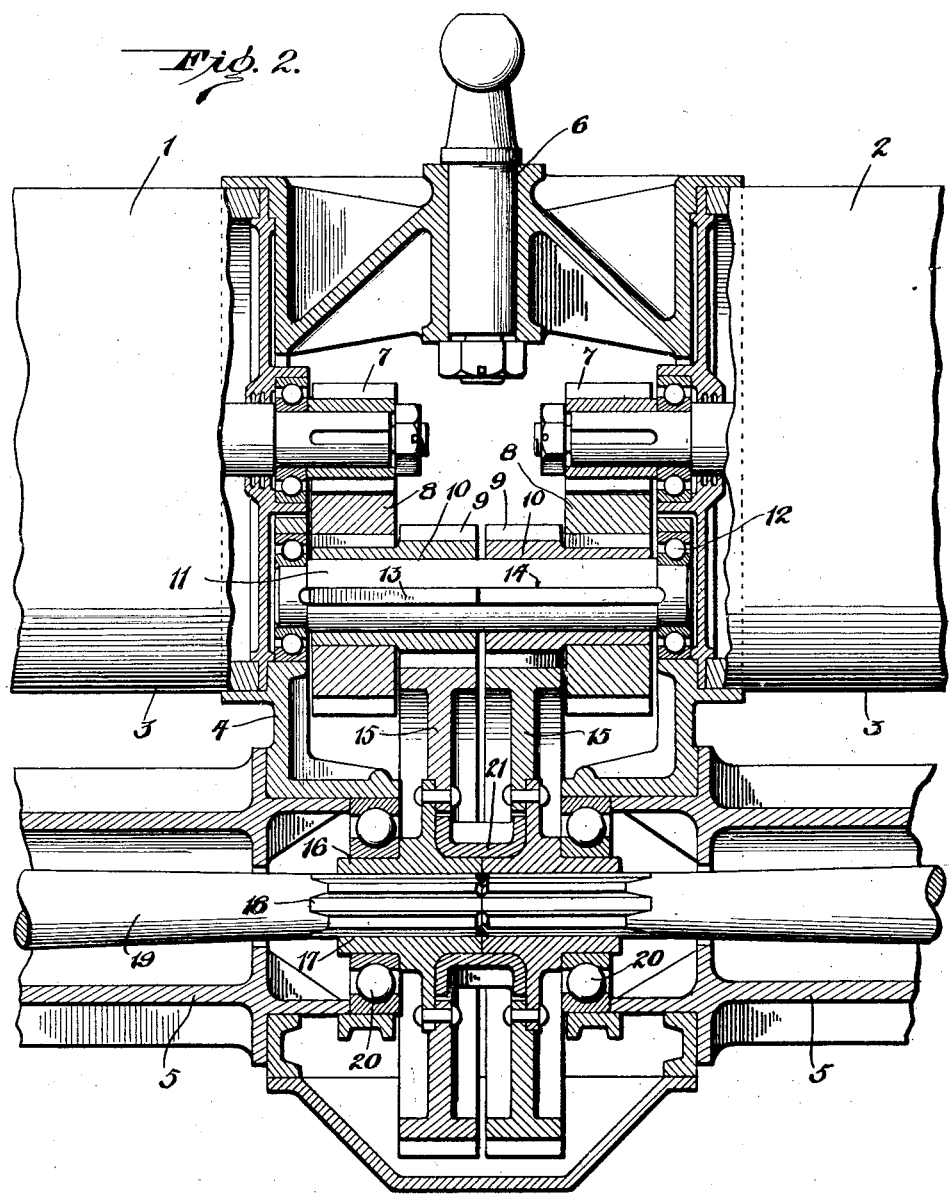

1,678,799

UNITED STATES PATENT OFFICE.

AXEL HJ. ASPROOTH, OF BALTIMORE, MARYLAND, AND ALFONSO M. LEONI, OF PHILADELPHIA, PENNSYLVANIA, ASSIGNORS TO ELECTRO-MOTIVE DEVICES, INC., OF PHILADELPHIA, PENNSYLVANIA, A CORPORATION OF NEW JERSEY.

TWO-MOTOR DRIVE FOR VEHICLES.

Application filed April 12, 1923. Serial No. 631,566.

This invention is directed to improvements in or in connection with plural motor drives for electrically propelled vehicles.

The invention provides an all-spur gear drive in the use of two motors, wherein the intermediate set of gears, while arranged to permit the necessary differentiation in the driving action when required, are mounted in such relation to their supporting countershaft as to reduce wear of the shaft or hubs of the gears to a minimum.

Furthermore, in the improved drives, the relation of the intermediate gears and countershaft is such that in the wear of such gears as are normally free of the shaft to permit the necessary differentiation, the free gears may be fixed with relation to the shaft and the companion gears secured to such shaft, thus transferring the wear to an unworn portion, while at the same time nullifying the effect of the wear of the initially-free set of gears. Thus, without renewal, the construction provides for a substantially double life of the intermediate gears so far as wear is concerned.

The final drive gears, according to this invention, are mounted in their relation to the jack-shafts on outer bearings and are supported at their inner or adjacent ends in such way that the final drive gears are held together and rigidly in line, while affording the customary reciprocating movements of the final drive gears for a complete and free differentation of the wheels. This disposition of the final drive gears admits of the slipping in and out of the jack shafts from the wheel hubs without the necessity of otherwise disturbing the arrangements.

The invention also contemplates an assembly of gear housing and motor support, whereby the motors are mounted in opposed horizontal relation and laterally of the axle housing, in order to permit a material portion of the motor weight to be directly supported from the frame of the vehicle, and spring supported, if desired, to avoid communication of road shocks to the motors.

The invention also contemplates simple and effective means for supporting the overhanging portions of the motors.

The invention is illustrated in the accompanying drawings, in which:—

Fig. 1 is a view in plan, partly in section, showing the improved drive unit.

Fig. 2 is an enlarged sectional view, showing the spur-gear drive.

The improved drive comprises two motors 1 and 2, mounted in opposed relation in protecting sleeves 3, secured to and projecting in opposite relation from a gear housing 4. The housing 4, is provided with sleeve projections 5, forming part or all of the axle housing.

The twin motors are thus arranged in substantially horizontal alignment with the axle. If desired, and as preferred, the free end of the housing thus provided may be supported directly from the frame, as by a torque arm 6, anchored in the housing end, and provided with a ball terminal to admit of universal co-operation with a spring support of conventional design.

The motors 1 and 2 are provided with the usual motor pinions 7, which co-operate with what is termed the intermediate gears. The latter are arranged in duplicate gear sets, each including a gear 8 to be operated by the motor pinion, and a gear 9 to be in mesh with the final drive gear. These gear sets are here shown as including a hub 10, with which the gear 9 is integral and on which the gear 8 is keyed, though it is obvious that both gears may be keyed or integral with the hub, as may be mechanically expedient.

The gear sets of intermediate gears are mounted on a counter shaft 11, which is terminally supported in appropriate bearings 12 in the housing walls, thereby permitting free rotation of the counter shaft. To provide for the necessary differentiation in the drive, one of the gear sets is mounted for free rotation on the shaft 11, while the other set is keyed thereon by a key 13, seating in a key slot 14. Thus on straight drive the shaft and idle gear set—that gear set not secured to the shaft—are driven at substantially the same speed, and hence there is little of any wear between the hub of the idle set and the counter shaft. In the differential movement, however, the idle set and shaft turn relatively and wear eventually ensues. In this contingency, the key 13 is simply transferred to the worn set, the key seat or slot 14 preferably extending throughout the length of the shaft 11. The worn set is thus fixed with relation to the shaft, and the previously fixed set is capable of free movement with respect to the shaft. Thus the wear of the first set is entirely discounted so far as any bad results are concerned and an unworn set permitted the free movement. That portion of the key slot 14, not occupied by the key in either position of the latter serves as an oil channel for lubrication of the idle set.

Thus this detail of the invention provides for a freely rotatable and bearing supported countershaft, as distinguished from the fixed countershaft of previous similar constructions, thus eliminating the initial wear where both sets of gears are free on the shaft. Furthermore, the straight drive occasions little if any wear between the free gear set and the shaft, as the speed of both is practically the same. Again, if wear occurs in the free set, that set is made the fixed set and the previously fixed, and, of course entirely unworn set becomes the free set. This result is attained, as previously remarked, simply through the transference of a key lock.

The final drive gears 15, those with which the gears 9 coact, are mounted in the axle portion of the gear housing, having extended hubs 16 formed with key-ways 17 to receive the splined ends 18 of the jack-shafts 19. The hubs 16 of the final drive gears are supported at their outer ends in bearings 20 arranged in the housing, and are connected at their inner ends by a sleeve 21, preferably of bronze or like material, which overlies the junction of the gear hubs and has end flange portions to extend radially of the hub flanges to which the gear sections are bolted. The sleeve 21 supports the inner ends of the final drive gear hubs and holds them rigidly together in line, without interfering with the necessary limited reciprocating movements of the hubs in their office of differentiation. This construction and arrangement provides for minimum wear of the sleeve and hubs as the relative movement at this point is very slow.

Either of the final gear assemblies in substantially one unit, permits full differential movement, perfect and maintained alignment and a full bearing support, the unitary construction admitting of the jack shafts being slipped into and out of co-operation with the gears without disturbing the assembly or necessitating dismantling thereof.

It is to be understood that both sets of intermediate gears, that is the keyed set and free set, are permitted free longitudinal movement relative to the countershaft, the key fit being sufficiently loose to permit this movement, in order to afford an automatic adjustment of the intermediate gears and motor pinions if herring-bone gears are used, instead of the spur gears shown.

Having described the nature and objects of the invention, we claim:—

1. In a two-motor drive for vehicles, motor pinions, an axle, final drive gears cooperating with the axle, and intermediate gearing including a rotatable countershaft, independent gear sets, and means for coupling one of the gear sets relatively to the countershaft.

2. In a two-motor drive for vehicles, motor pinions, final drive gears, and intermediate gearing including a rotatable countershaft, independent gear sets, and means for establishing one of said gear sets in fixed relation on said countershaft with the other gear set free on the countershaft.

3. In a two-motor drive for vehicles, motor pinions, final drive gears, and intermediate gear sets, and a rotatable countershaft for both said gear sets, one of said gear sets being relatively fixed on said shaft while the other gear set is free on the shaft.

4. In a two-motor drive for vehicles, motor pinions, final drive gears, and intermediate gearing comprising a rotatable countershaft, independent gears on said countershaft, and means operable at will for fixing either of said gear sets with relation to the countershaft.

5. In a two-motor drive for vehicles, motor pinions, final drive gears, intermediate gear sets capable of relative differential movement, a countershaft, and interchangeable means for selectively securing the gear sets with relation to the counter shaft.

6. In a two-motor drive, motor pinions, final drive gears, independent intermediate gear sets, a rotatable countershaft on which said sets are mounted, said countershaft having a keyway common to said sets, and a key selectively cooperating with the keyway and either gear set.

In testimony whereof we have hereunto set our signatures.

AXEL HJ. ASPROOTH,
ALFONSO M. LEONI.